US011273795B2

(12) United States Patent
Egner-Walter et al.

(10) Patent No.: US 11,273,795 B2
(45) Date of Patent: Mar. 15, 2022

(54) WIPER BLADE AND WIPER ARM

(71) Applicant: Valeo Systèmes d'Essuyage, Le Mesnil Saint Denis (FR)

(72) Inventors: Bruno Egner-Walter, Issoire (FR); Michael Schäuble, Issoire (FR)

(73) Assignee: Valeo Systémes d'Essuyage, Le Mesnil Saint Denis (FR)

( * ) Notice: Subject to any disclaimer, the term of this patent is extended or adjusted under 35 U.S.C. 154(b) by 454 days.

(21) Appl. No.: 16/298,599

(22) Filed: Mar. 11, 2019

(65) Prior Publication Data

US 2019/0202408 A1    Jul. 4, 2019

Related U.S. Application Data

(63) Continuation of application No. 15/249,896, filed on Aug. 29, 2016, now Pat. No. 10,266,152, which is a
(Continued)

(30) Foreign Application Priority Data

Jun. 10, 2008    (DE) .................... 10 2008 027 566.2

(51) Int. Cl.
*B60S 1/38*    (2006.01)
*B60S 1/40*    (2006.01)

(52) U.S. Cl.
CPC ............. *B60S 1/3805* (2013.01); *B60S 1/381* (2013.01); *B60S 1/3856* (2013.01);
(Continued)

(58) Field of Classification Search
CPC .... B60S 1/3805; B60S 1/3803; B60S 1/3429; B60S 1/40; B60S 1/4038; B60S 1/4045;
(Continued)

(56) References Cited

U.S. PATENT DOCUMENTS 2,119,587 A * 6/1938 Lamb .................... B60S 1/3805
15/250.09
2,587,129 A * 2/1952 Fehrman ................ A61D 15/00
600/244
(Continued)

FOREIGN PATENT DOCUMENTS

JP                10-329655        * 12/1998

*Primary Examiner* — Gary K. Graham
(74) *Attorney, Agent, or Firm* — Osha Bergman Watanabe & Burton LLP

(57) ABSTRACT

A wiper arm for use with a wiper blade, which is mechanically and detachably connectable to the wiper arm and to a wiper arm adapter by joining in an assembly direction using a wiper blade adapter, includes an electrical connecting element, disposed on a wiper arm side of the wiper blade adapter, configured to reversibly establish a connection to a second electrical connecting element on a wiper blade side of the wiper blade adapter. The connection between the electrical connecting element and the second electrical connecting element is formed along the assembly direction. The electrical connecting element and the second electrical connecting element are mounted floating. The electrical connecting element and the second electrical connecting element are mounted deflectable in a spatial plane oriented crossways to the assembly direction.

20 Claims, 8 Drawing Sheets

Related U.S. Application Data continuation of application No. 12/996,774, filed as application No. PCT/EP2009/004178 on Jun. 10, 2009, now Pat. No. 9,452,736.

(52) U.S. Cl.
CPC ............... *B60S 1/3874* (2013.01); *B60S 1/40* (2013.01); *B60S 1/4016* (2013.01); *B60S 1/4038* (2013.01); *B60S 1/4045* (2013.01); *B60S 1/4048* (2013.01); *B60S 1/3849* (2013.01); *B60S 1/3868* (2013.01); *B60S 1/3879* (2013.01); *B60S 1/3881* (2013.01); *B60S 2001/3812* (2013.01); *B60S 2001/4054* (2013.01)

(58) Field of Classification Search
CPC ................. B60S 1/3849; B60S 1/4048; B60S 2001/4054; B60S 1/3868; B60S 2001/3812

USPC ............... 15/250.07, 250.32, 250.08, 250.09
See application file for complete search history.

(56) References Cited

U.S. PATENT DOCUMENTS

| | | | | |
|---|---|---|---|---|
| 3,408,678 A | * | 11/1968 | Linker | B60S 1/08 |
| | | | | 15/250.05 |
| 3,419,932 A | * | 1/1969 | Linker | B60S 1/08 |
| | | | | 15/250.06 |
| 3,461,477 A | * | 8/1969 | Ikner | B60S 1/3805 |
| | | | | 15/250.06 |
| 3,639,938 A | * | 2/1972 | Golden | B60S 1/08 |
| | | | | 15/250.06 |
| 9,452,736 B2 | * | 9/2016 | Egner-Walter | B60S 1/3805 |
| 2009/0070952 A1 | * | 3/2009 | Peng | B60S 1/3805 |
| | | | | 15/250.06 |

* cited by examiner

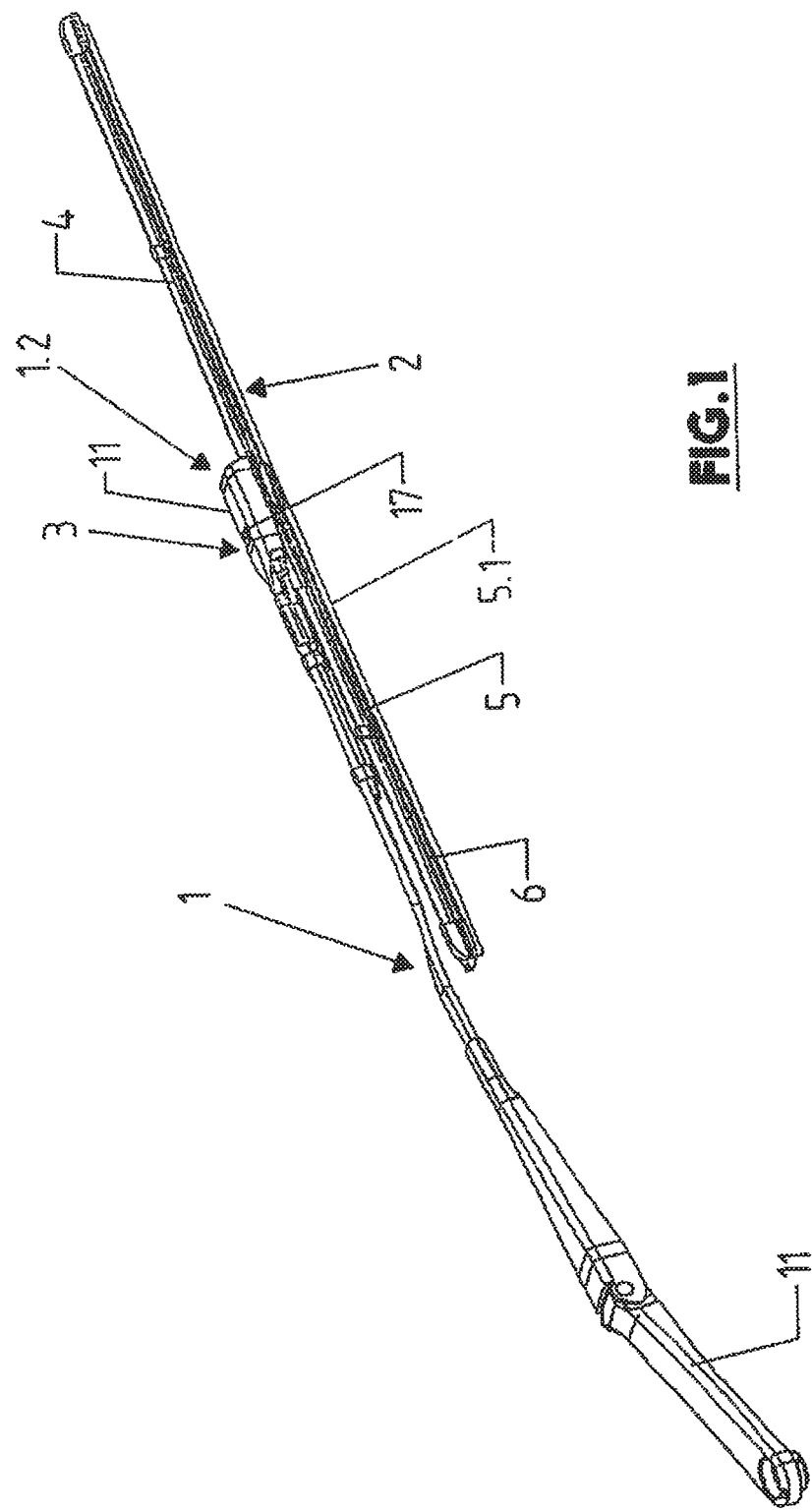

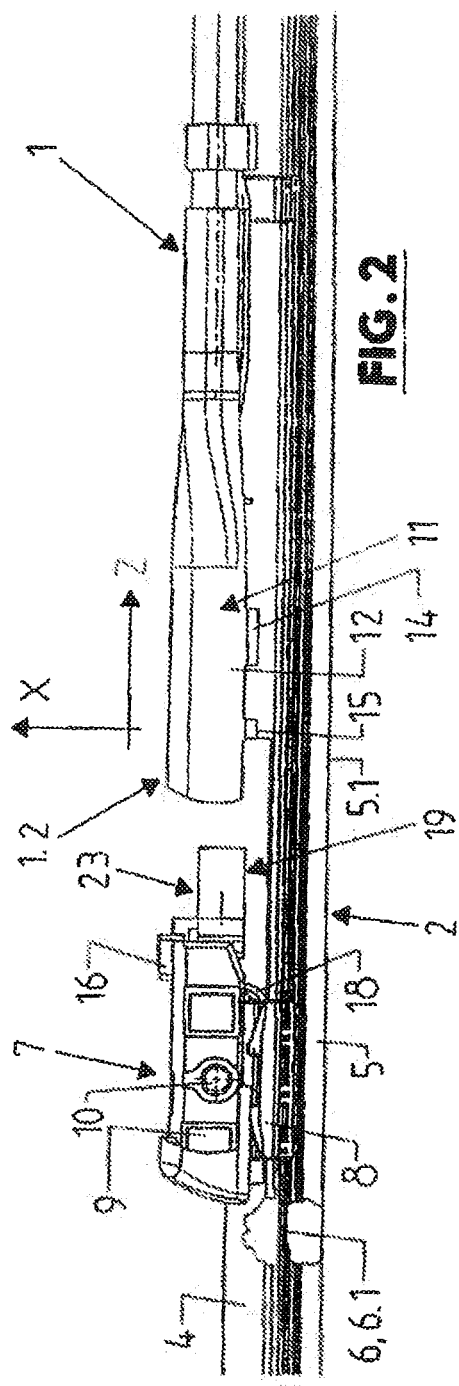
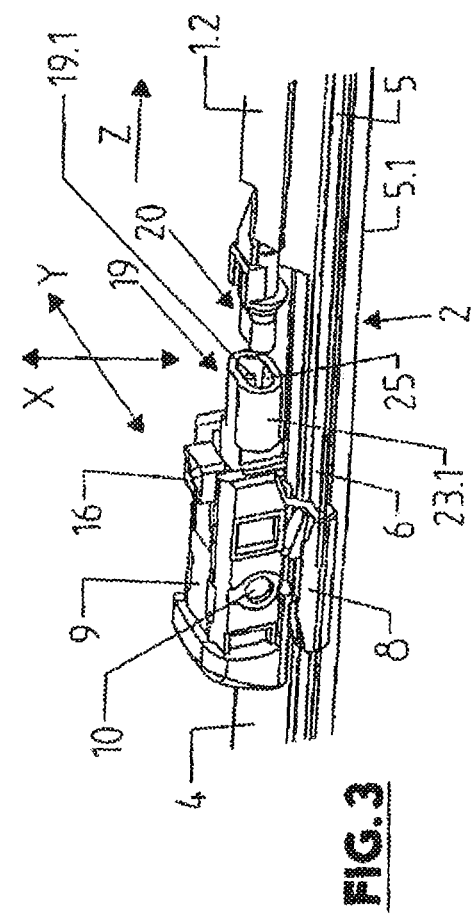

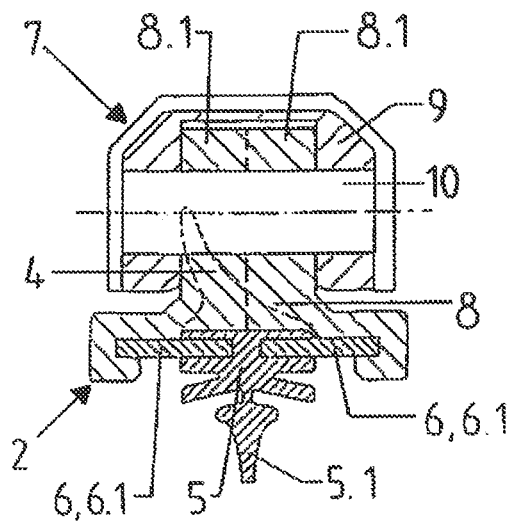
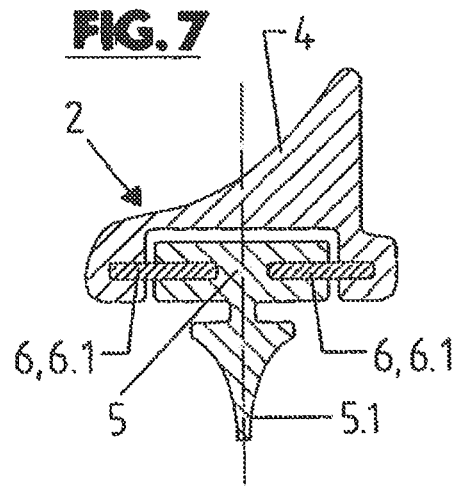
FIG.6
FIG.7
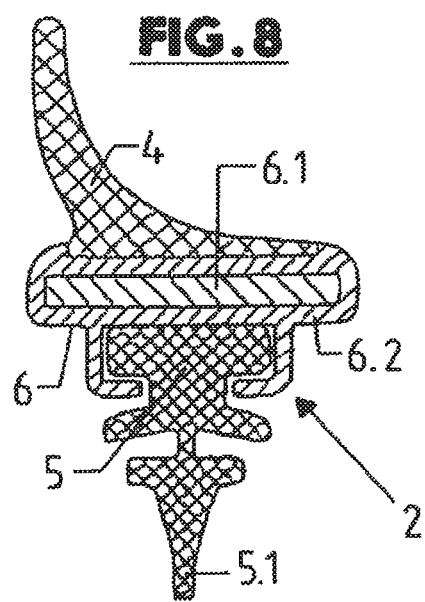
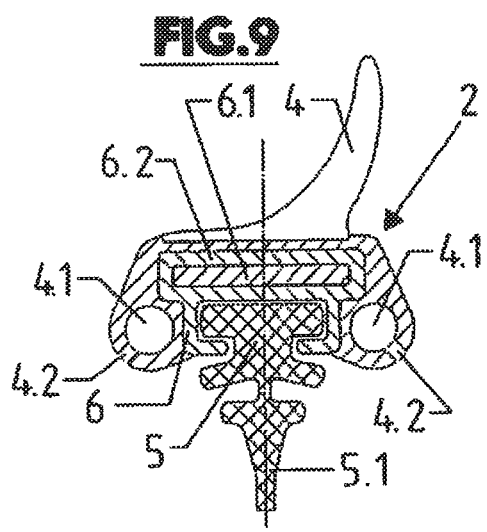
FIG.8
FIG.9

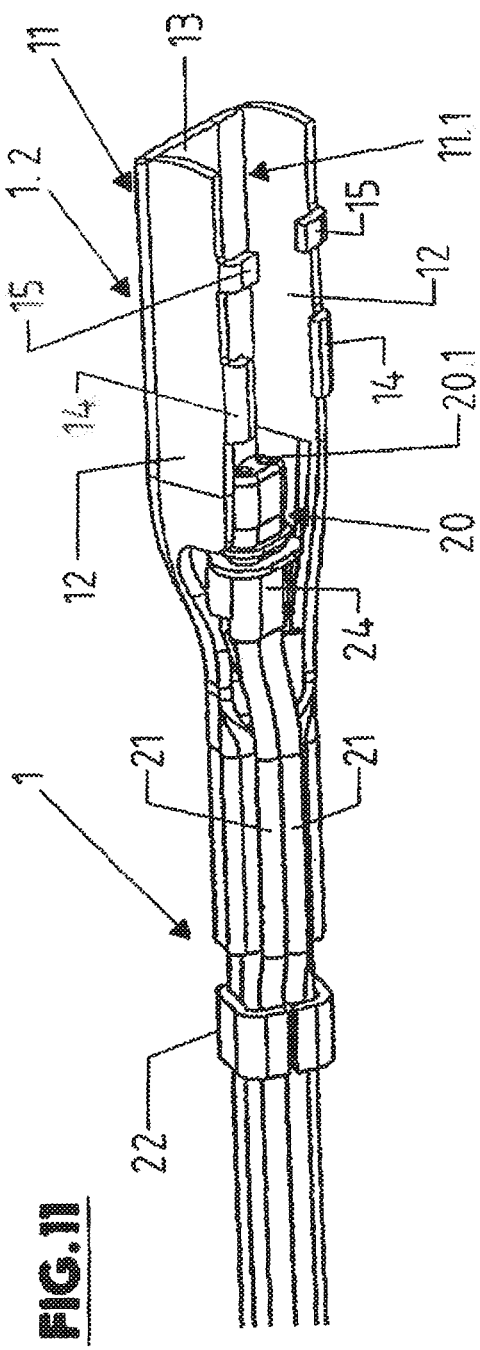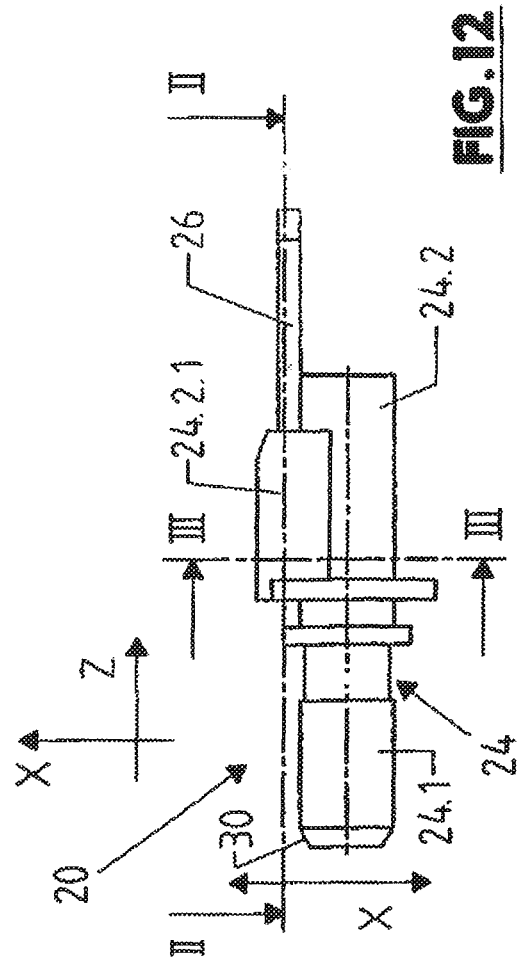

WIPER BLADE AND WIPER ARM

BACKGROUND

Field of Invention

The invention relates to a wiper blade and to a wiper arm.

Related Art

Wiper blades for use in windscreen wiper modules for cleaning windscreens on vehicles, particularly motor vehicles, are known in various different embodiments. Wiper blades also designed as bow wiper blades (JP 10-329655) are particularly known in this case, which ware equipped with an electric heating element in the area of the wiper rubber or a wiping strip bearing the wiper rubber. The electrical connection of the heating element to a connecting cable provided on the wiper arm side is established through an electric plug-socket connection, consisting of a connecting element on a wiper blade adapter on the wiper blade side and a connecting element on a wiper arm end designed as a hook on the wiper arm side. The electrical connecting elements are arranged in such a manner in this case that on insertion into and joining of the wiper blade adapter in wiper arm adapter, i.e. during the mechanical connection of the wiper blade to the wiper arm, the electrical connection is established at the same time. It is disadvantageous that the electrical connection between the wiper arm and the wiper blade is only realised with a single pole and consequently current flow over the wiper arm and the wiper arm in addition to the wiper blade adapter is necessary, which particularly in case of corrosion or malfunctions, results in heating of the wiper blade. It is furthermore disadvantageous that on insertion into and joining of the wiper blade adapter in the wiper arm adapter formed by the hook-shaped end of the wiper arm, a reliable electrical connection is not guaranteed, particularly in case of manufacturing tolerances.

Electrically heated wiper blades likewise designed as bow wiper blades are furthermore known (DE-GM 1 989 712), in which the electrical connection of the heating element provided in the wiper blade is established through an external supply line equipped with a two-pole connector and laid on the wiper arm and to be more precise, through connection of the connector to sockets provided on the side of the wiper blade body. The disadvantage with these known wiper blades is that in addition to the mechanical connection between the wiper blade and the wiper arm, the electrical connection must be established separately and that with the wiper blade installed, the plug connection between the external electrical supply line and the wiper blade is not only objectionably in evidence, but there is also the risk that this electrical connection will be undesirably released during wiping operation.

SUMMARY

The purpose of the invention is to illustrate an electrically heated wiper blade, preferably in the form of a so-called flat wiper blade and a so-called flat-bar wiper blade, in which in case of the mechanical connection to the wiper arm, the electrical connection to an external electrical supply line is at the same time reliably established and to be more precise, independently of any tolerances due to manufacture and/or assembly.

A particularity of the invention lies in the fact that at least one of the two electrical connecting elements designed for mutual connection in an assembly direction, i.e. the electrical connecting element on the wiper blade side and the electrical connecting element on the wiper arm side, is provided to be floating and deflectable in a spatial plane oriented crossways in relation to the assembly direction, i.e. is movable within certain limits. It is therefore sufficient if one of the two electrical connecting elements is provided to be floating and deflectable and the relevant other, i.e. corresponding connecting element is provided to be rigid and unmovable. In other words, this other, i.e. corresponding electrical connecting element is designed for interaction with an electrical connecting element which is held in a floating and deflectable fashion, i.e. movable to a certain extent, in a spatial plane oriented crossways to the assembly direction. Ultimately, the invention also comprises a configuration of this type in which both electrical connecting elements intended for interaction, i.e. both the electrical connecting element on the wiper blade side and the electrical connecting element on the wiper arm side, are floating and deflectable in a spatial plane oriented crossways to the assembly direction.

A wiper blade adapter at least partially manufactured from plastic material is advantageous, with the first adapter section fixed on the carrier element of the wiper blade being manufactured as a moulding or as a punched and bent component made of metal and the second adapter section being manufactured as a plastic moulding. The second adapter section, which is articulated to the first adapter section by means of an adapter joint, is designed for a positive-locking receptacle in the wiper arm adapter.

In specific cases, it may however be advantageous if the first and second adapter sections of the wiper blade adapter are manufactured from plastic material.

Further developments, advantages and application possibilities of the invention are also apparent from the following description of examples of embodiment and from the figures. In this case, all the characteristics described and/or illustrated are in themselves or in any desired combination fundamentally a subject of the invention, regardless of their summary in the claims or their backward relation. The contents of the claims are also made an integral part of the description.

BRIEF DESCRIPTION OF THE DRAWINGS

The invention is described below in further detail in examples of embodiment based on the figures:

FIG. 1 shows the wiper arm of a windscreen wiper module together with a wiper blade fixed on this wiper arm according to the invention;

FIGS. 2 and 3 show a partial representation of the wiper arm in FIG. 1, together with the wiper blade removed from the wiper arm in the area of a wiper blade adapter;

FIGS. 6 to 9 show a cross-sectional representation of different variants of so-called flat wiper blades and flat-bar wiper blades;

FIG. 11 shows a perspective partial representation of the wiper arm in FIG. 1 and in a view from below;

FIG. 12 shows the electrical connecting element on the wiper arm side together with a retaining plate in a side view;

DETAILED DESCRIPTION

Figure 4:
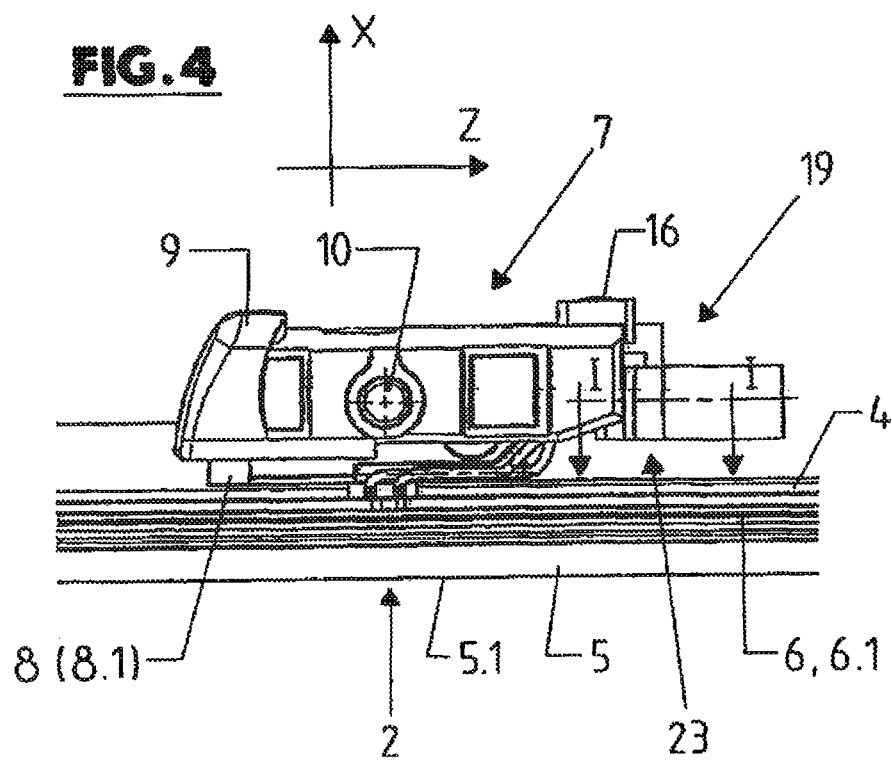
FIG. 4 shows an enlarged representation of the wiper blade adapter provided on the wiper blade.
Figure 5:
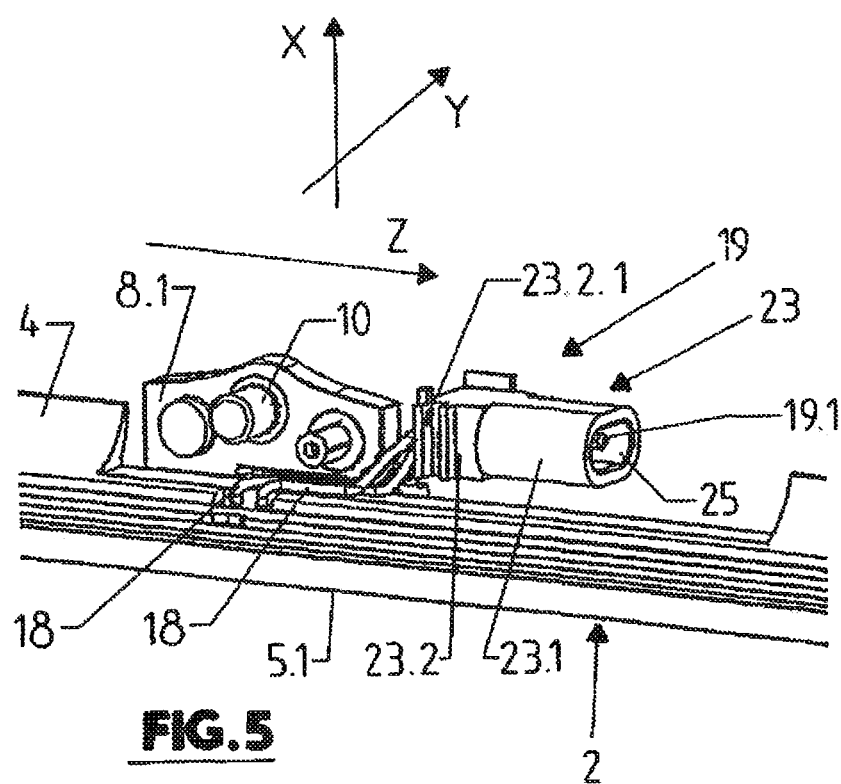
FIG. 5 shows a perspective partial representation of the wiper blade, together with an element of the wiper blade adapter in addition to with the electrical terminal or connecting element on the wiper blade side.
Figure 10:
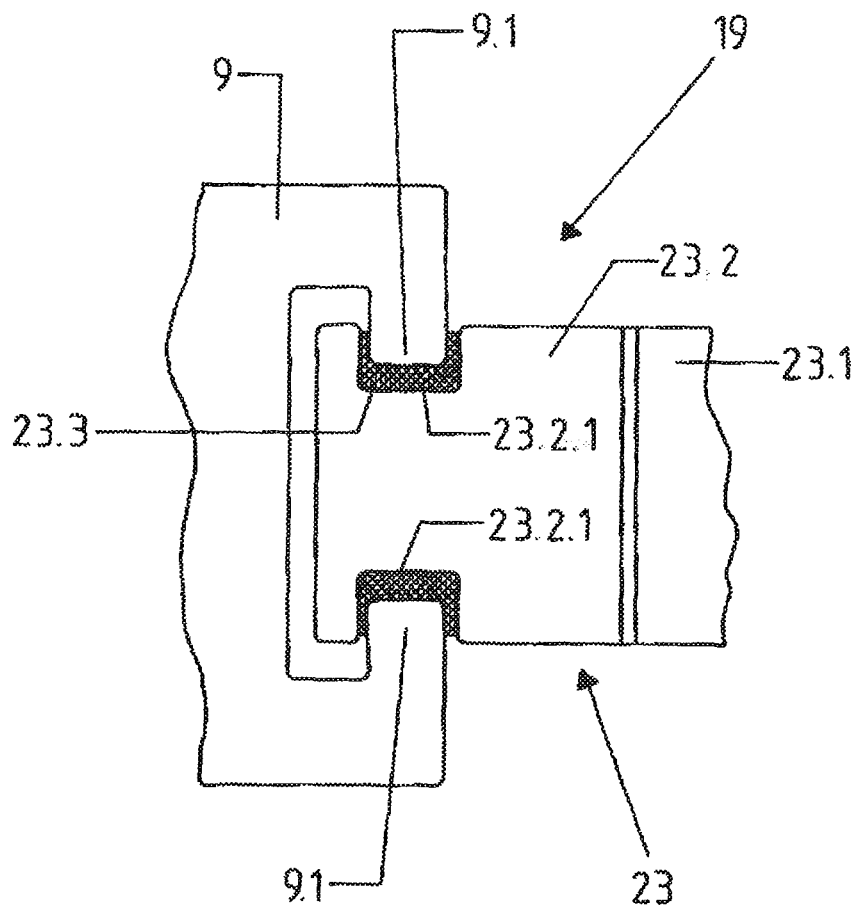
FIG. 10 shows a simplified representation of a cross-section along the line I-I of FIG. 4 in the area of the "floating" attachment of the electrical connecting element on the wiper blade side on the wiper blade adapter.
Figure 13:
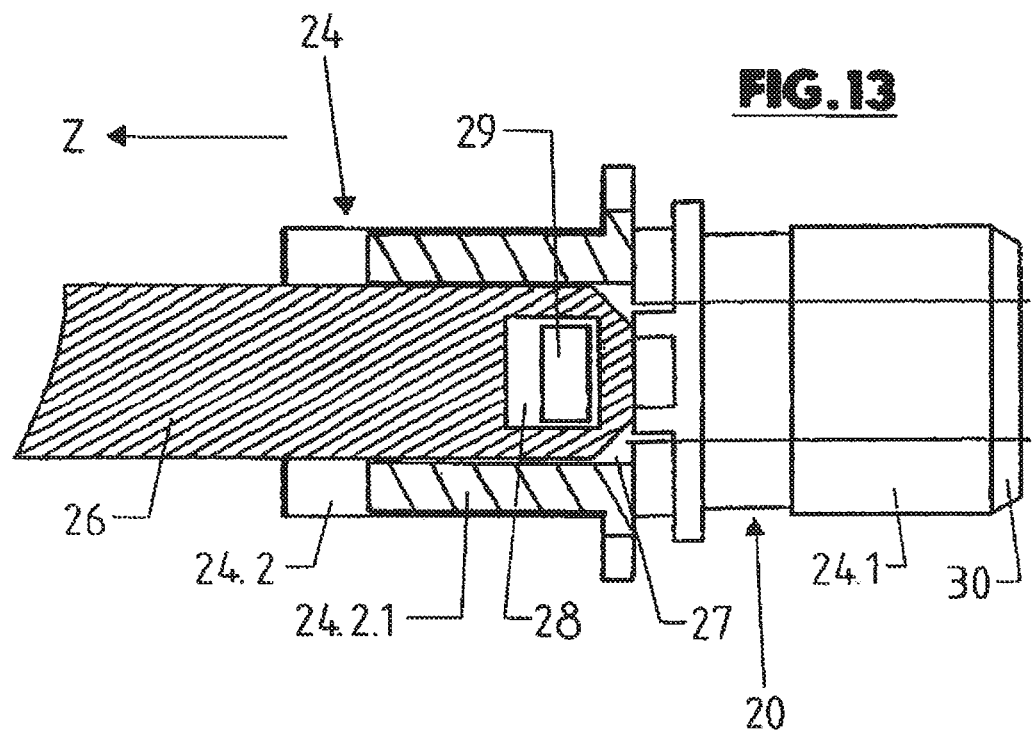
FIG. 13 shows a cross-section along the line Il-Il in FIG. 12.
Figure 14:
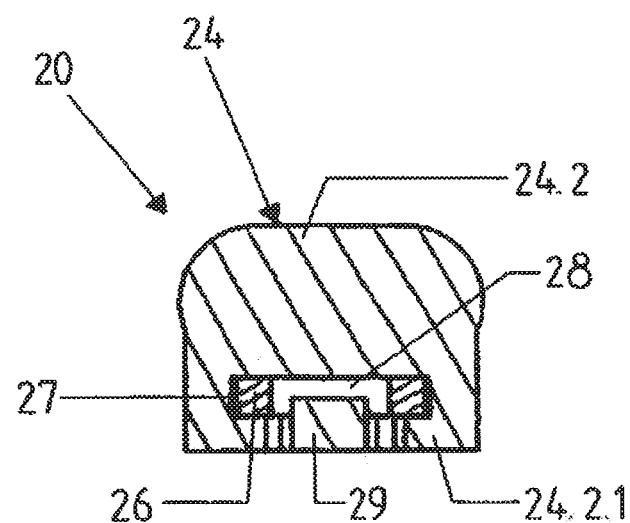
FIG. 14 shows a cross-section along the line IM-III in FIG. 12.

In the figures, 1 denotes the wiper arm of a windscreen wiper module for vehicles, for example road vehicles, otherwise not illustrated in further detail and 2 designates the wiper blade detachably connected to one end of the wiper arm 1 by means of a mechanical/electrical connection. In the installed state, the wiper arm 1 is fixed at its end distant from the wiper arm-wiper blade connection 3 and formed by a bearing section 1.1 to a wiper shaft, not illustrated, of a likewise not illustrated windscreen wiper drive.

The wiper blade 2 represented in FIGS. 1-9 is therefore designed as a so-called flat wiper blade or flat-bar wiper blade. It presents in the known manner a carrier element 6, extending over the entire length of the wiper blade 2, on which a wiper rubber 5 likewise extending over the entire length of the wiper blade 2 and manufactured from an elastomeric plastic or rubber is held.

In FIGS. 2-7, the carrier element 6 is formed of two flat spring rails 6.1 made of spring steel, which are connected to each other in a suitable manner and part of the width of which engages in longitudinal grooves on the side of the wiper rubber 5, with the other end of the width protruding laterally from the wiper rubber 5. For detachable fixing of the wiper blade 2, a wiper blade adapter 7 is provided on the latter in the centre of the wiper blade or approximately in the centre of the wiper blade, designed in two sections and consisting of a first adapter section 8 and a second adapter section 9, which are pivotally connected to one another by means of hinge bolt 10. The adapter section 8 fixed in this case indirectly or directly to the carrier element 6 of the wiper arm 2 formed by the spring rails 6.1 and to be more precise, overlapping the wiper rubber 5 on its upper side facing away from the wiping lip 5.1 in the manner of a slide. For this purpose, the first adapter section 8 consists of two essentially plate-like adapter section elements 8.1 in the embodiment presented, each of which is provided positively overlapping on one long side of the wiper blade 2 a periphery of a spring rail 6.1 at this position. The two adapter section elements 8.1 are connected to each other by means of connecting elements, such that the carrier element 6 formed by two spring rails 6.1 is held between the adapter section elements 8.1. The wiper rubber 5 held between the spring rails 6.1 is provided here on its upper side with a spoiler 4 designed in a single piece with the wiper rubber. This is also apparent from FIG. 6, which shows a cross-section of a flat wiper blade in the area of the wiper blade adapter 7 and to be more precise, through the axis of the hinge bolt 10.

It is also possible for the spoiler 4 to be designed as a separate component and to be fixed or held on the spring rails 6.1. An arrangement of this type is apparent from FIG. 7, with a cross-section outside the wiper blade adapter being shown in this case.

A flat wiper blade 2 may also be designed instead in such a manner that the carrier element 6 is an elongated, elastic, profile rail 6.2 receiving the head section of the wiper rubber 5, with one or several spring rails 6.1 made of metal or plastic material being arranged on or in the wiper rubber 5 and/or within the profile rail 6.2. The wiper blade adapter is mounted in such cases on the profile rail 6.2. On the upper side of the carrier element 6, a spoiler 4 connected in a single piece with the profile rail may be present, as is apparent from FIG. 8. Instead, as shown in FIG. 9, a separately manufactured spoiler 4 may also be mounted, preferably clipped in place, on the upper side of the profile rail 6.2 forming the carrier element 6. The wiper blades may of course be equipped in an intrinsically known manner with further technical details, as implied for instance in FIG. 9 with fluid ducts 4.1 and outlet orifices 4.2 for dispensing of washing fluid on to the windscreen to be cleaned.

The first adapter section 8 is articulated to the second adapter section 9 with a hinge bolt 10 and to be more precise such that a limited oscillating movement of the adapter section 8 and therefore of the wiper blade 2 in relation to the adapter section 9 and relative to the wiper arm 1 with the wiper blade 2 fixed on the wiper arm 1 is possible and to be more precise, around the axis of the hinge bolt 10, which is oriented vertically or transversally to a central plane of the wiper blade 2 encompassing the wiping lip 5.1.

The wiper blade adapter 7 is a part of the detachable connection 3 between the wiper blade 2 and the wiper arm 1, with the wiper arm 1 being provided with or designed with, on its free end distant from the bearing section 1.1, a wiper arm adapter 11 with a receiving opening or adapter opening 11.1. The adapter section 9 is insertable into the adapter opening 11.1 from the free end 1.2 of the wiper arm 1 in an assembly direction and in the Z axis and indeed in such a manner that the adapter section 9 is subsequently held positively and by catch engagement in the adapter opening 11.1. The first adapter section 8 of the wiper blade adapter 7 and the hinge bolt 10 are made of metal and the second adapter section 9 is manufactured as a plastic moulding.

For the positive-fitting arrangement of the second adapter section 9, the adapter opening 11.1 of the wiper arm 1 is formed of a U profile with the two shanks 12 arranged parallel to and spaced apart from one another and of the yoke section 13 connecting them. On the free edge distant from the yoke section 13, the shanks 12 are respectively provided with angled portions 14 and 15, such that the adapter section 9, after insertion in the adapter opening 11.1, is positively surrounded by the yoke section 13 and the shanks 12 on it top side and its two long sides running parallel or substantially to the longitudinal extension of the wiper blade 2 and is hereby precisely guided during joining. Furthermore, the angled portions 14 and 15 also positively engage behind the adapter section 9 on its underside facing away from the adapter section 8 and the wiper blade. On the upper side, the second adapter section 9 is equipped with a projection 16 formed on a sprung tongue, which engages as a latching means in a recess 17 provided on the yoke section 13 after insertion of the adapter section 9 into the adapter opening 11.1, thereby securing the wiper blade adapter 7 on the wiper arm 1 by catch engagement.

As shown in particular by FIG. 11, the adapter opening 11.1 is furthermore designed in such a manner that the U profile is open both towards the free end of the wiper arm and towards the wiper arm underside, which with the wiper arm 1 installed, faces towards the vehicle windscreen at least during wiping operation.

In order to prevent icing up of the wiper blade 2 and at the same time of the tilting web connecting the wiping lip 5.1 to the remaining part of the wiper rubber 5 and/or of one or several spray ducts 4.1, which are designed or provided in the superimposed spoiler section 4 (FIG. 9) or also in the wiper rubber or on the profile rail 6.2 and are equipped with a large number of outlet orifices 4.2 for application of a washing and cleaning fluid to the vehicle windscreen, the wiper blade 2 is designed as an electrically heated wiper blade. At least one electric heating element is provided for this purpose in or on the wiper blade 2 or however in the spray ducts 4.1. This heating element may present the most diverse realisations, for example in the form of a heating foil or however in the form of a heating filament. In the embodiment presented in the figures, the heating element consists of a heating filament 18 of this kind.

In order during mechanical attachment of the wiper blade 2 to the wiper arm 1 to also simultaneously establish automatically, i.e. solely by insertion of the adapter section 9 into the adapter opening 11.1, the necessary electrical connection with the heating element or heating filament 18, the connection 3 is designed as a mechanical/electrical connection and to be more precise, in addition to the elements already mentioned above effecting the mechanical connection with an electrical connecting element 19 on the wiper blade side and a connecting element 20 on the wiper arm side.

The two connecting elements 19 and 20 are respectively of two-pole execution and to be more precise, in the embodiment presented, the connecting element 19 is designed as a two-pole connector with the contact pins 19.1 and the connecting element 20 with the contact sockets 20.1. The two ends of the heating filament 18 are connected to the connecting element 19 and to the contact pins 19.1. The ends of a two-core electrical supply line 21 are connected to the connecting element 20 and to the contact sockets 20.1 at that point, running along the wiper arm 1 on the underside of the latter and by means of which the heatable wiper blade 2 is supplied with the necessary heating current from the electrical system on the vehicle side. The lead 21 is held on the underside of the wiper arm 1 with the aid of holders and clips 22. If specific designs or arrangements of the electrical heating elements require this, the electrical connecting elements 19, 20 on the wiper blade side and wiper arm side can also be equipped with more than two poles and contacts.

The electrical connecting elements 19 and 20 consist respectively of a housing 23 and 24 manufactured as a plastic moulding. The housing 23 of the connecting element 19 on the wiper blade side is shaped in this case such as to form a sleeve-like or bush-like housing section 23.1, the opening 25 of which receives both contact pins 19.1. The opening 25 is open on the front face of the housing section 23.1 adjacent to the free end of the contact pins 19.1. Furthermore, the housing 23 forms a housing section 23.2, with which the housing 23 is held on the adapter section 9 and indeed such that the axis of the opening 25 and therefore also the plug contacts parallel to this axis and spaced apart from one another are oriented in the in longitudinal direction of the wiper blade and respectively parallel to the longitudinal direction of the wiper arm, i.e. in the direction of the Z axis.

For a better understanding of the explanations below, three spatial axes respectively oriented vertically to one another are indicated, names the X axis, Y axis and Z axis, among which the X axis and the Y axis are oriented crossways and the Z axis is oriented parallel to the longitudinal extension of the wiper blade 2 and the wiper arm 1, as illustrated in the respective figures. In the above definition of the orientation of the spatial axes, the fact was expressly disregarded that the second adapter section 9 is pivotable within certain limits in relation to the first adapter section 8 fixed on the wiper blade carrier element 6. The direction defined as the "assembly direction" in connection with the invention runs in the direction of the spatial axis designated as the Z axis.

In the embodiment presented in FIGS. 2-5 and 10-14, the housing 23 of the connecting element 19 on the wiper blade side is maintained floating on the second adapter section 9 and indeed such that to a limited extent, a movement of the housing 23 and therefore the electrical connecting element 19 is possible in the spatial plane crossways to the Z axis in relation to the second adapter section 9, as implied for example in FIG. 3 by the double arrows running in the X axis and Y axis. The floating connection between the housing 23 and the adapter section 9 is achieved for example by the fact that webs 9.1 moulded on the adapter section 9 engage with a sufficient amount of play in recesses 23.2.1 formed on the outer surface of the housing section 23.2. Other possibilities for the floating arrangement of the housing 23 are also conceivable, for example in the form of the housing 23 being held on the adapter section 9 by means of an elastic section or an elastic material 23.3 and/or the housing 23 being manufactured at least on its housing section 23.2 or however in its entirety from an elastic material, so that the virtually floating arrangement or connection of the housing to the adapter section 9 is achieved by means of the own elasticity of the housing section 23.2.

The attachment of the housing 23 to the second adapter section 9 is furthermore designed such that the open side of the opening 25 faces away from the adapter section 9 and the housing protrudes over the narrow side of the adapter section 9.

The housing 24 of the electrical connecting element 20 on the wiper arm side consists of a housing section 24.1 in which the two contact sockets 20.1 are received and indeed such that these contacts are exposed on a front face of the housing section 24.1 in order to receive or for insertion of the contact pins 19.1. The housing section 24.1 is adjoined by the housing section 24.2, with which the housing 24 is attached by catch engagement on a retaining tab or on a retaining plate 26, which for its part is held on the wiper arm 1 in such a manner that the housing 24 and therefore the electrical connecting element 20 on the wiper arm side is located within the adapter opening 11.1 and to be more precise, such that the front face of the housing section 24.1 presenting the contact sockets 20.1 lies at a distance opposite the open side of the adapter opening 11.1 provided on the free end 1.2 of the wiper arm 1, as illustrated in FIG. 11. The connection of the housing 24 to the wiper arm 1 by means of the retaining plate 26 is designed such that the housing 24 and therefore the connecting element 20 on the wiper arm side is provided as fixed or essentially fixed, i.e. not floating, in the adapter opening 11.1.

The housing section 24.2 is provided with a lateral widening 24.2.1 for the locking connection of the housing 24 to the retaining plate 26, presenting a slit-like opening 27 adapted to the thickness and width of the retaining plate 26, with which the housing 24 is pushed on to one end of the retaining plate 26 and is fixed at this position by catch engagement. The retaining plate 26 presents an opening 28 for this purpose, in which a latch 29 formed on the widening 24.2.1 engages and locks.

The housing section 24.1 is adapted on its outer surface to the cross-section of the opening 25, so that the housing section 24 can be positively inserted into the opening 25 and in so doing, the plug contacts 19.1 engage in the contact sockets 20.1, thereby establishing the electrical connection between the electrical connecting elements 19 and 20 and therefore between the heating element on the wiper blade side and the connecting lead. As a result of the floating arrangement of the connecting element 19 on the adapter section 9 and also the chamfer 30 of the housing section 24.1 on its front face moving ahead during insertion into the opening 25, mutual alignment of the components to be connected together occurs automatically. Consequently, easy and secure electrical connection of the wiper blade 2 to the wiper arm 1 is also guaranteed by means of the mechanical/electrical connection 3 simultaneously with mechanical connection.

The two electrical connecting elements 19 and 20 and their housings 23 and 24 are designed and arranged such that after establishing the mechanical and electrical connections, the transition between the connecting elements 19 and 20 and the housings 23 and 24 is sealed, particularly against undesirable ingress of dirt and water and/or moisture. This is of great importance since windscreen wiper modules are generally required to display a high level of functional safety under harsh external operating conditions. For sealing, the housing section 24.1 is equipped with moulded on sealing ribs sealing the connection area between the housing sections at the transition to the housing section 24.2 presenting an enlarged diameter.

It was assumed above that the electrical connecting element 19 on the wiper blade side is arranged to be floating and the connecting element 20 on the wiper blade side is arranged to be non-floating or essentially non-floating and to be more precise, with a corresponding rigid design of the retaining plate 26.

Figure 15:
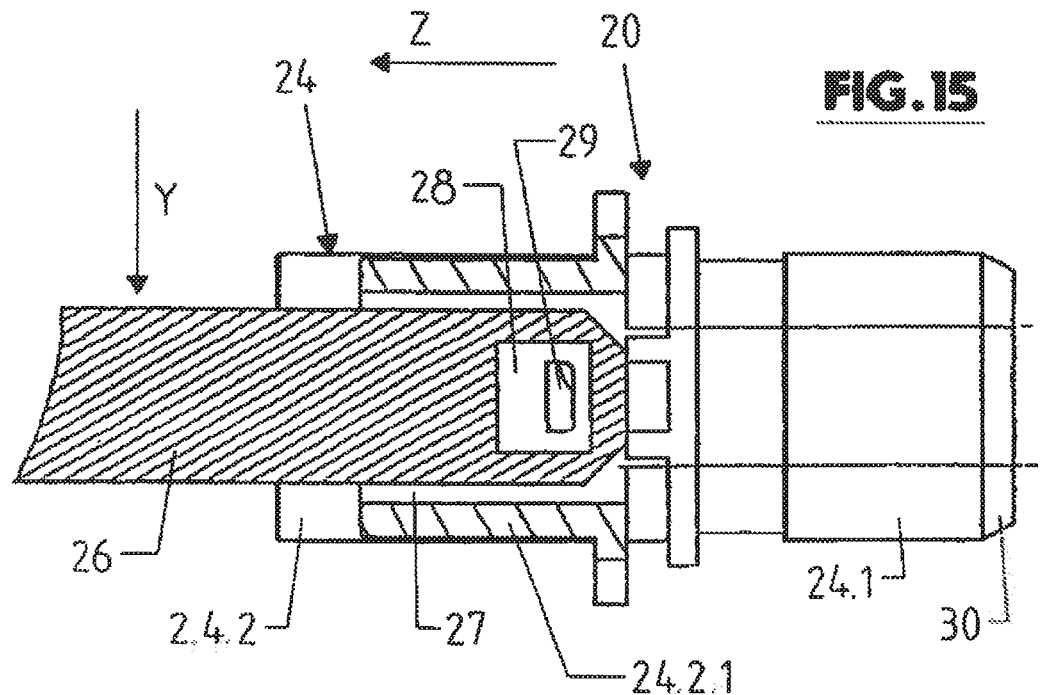
FIGS. 15 and 16 show representations as in FIGS. 13 and 14 with a further form of embodiment of the invention.
Figure 16:
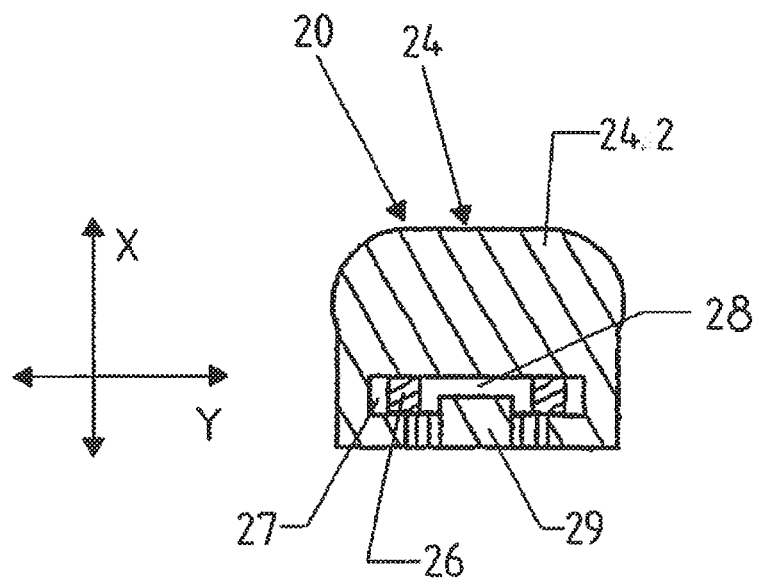

FIGS. 15 and 16 illustrate in contrast an attachment of the electrical connecting element 20 on the wiper arm side and the latter's housing in such a manner that this connecting element is arranged to be floating or as far as possible floating on the wiper arm 1 or in the adapter opening 11.1. The retaining plate 26 is designed for this purpose such that it acts in the manner of a leaf spring and thereby a floating attachment of the connecting element 20 and the housing 24 in an axial direction essentially vertical to the surface sides of the retaining plate 26 is achieved, i.e. in the direction of the X axis, as implied in FIG. 16 by the double arrow oriented in the X axis. In this embodiment, the opening 27 is realised in this case according to FIG. 15 such that it presents a width in the Y axis which is somewhat greater than the width of the spring plate 26, so that mobility in the Y axis is also achieved for the attached housing 24, as implied in FIG. 12 by the double arrow in the Y axis. The electrical connecting element 20 is therefore held floating and indeed once again for easy connection of the electrical connecting elements 19 and 20 simultaneously with establishment of the mechanical connection between the wiper blade 2 and the wiper arm 1.

LIST OF REFERENCES 1 wiper arm
1.1 joint support
1.2 free end of wiper arm
2 wiper blade
3 mechanical/electrical connection arrangement
4 spoiler
4.1 fluid duct
4.2 outlet orifice
5 wiper rubber
5.1 wiping lip
6 carrier element
6.1 spring rail
6.2 profile rail
7 wiper blade adapter
8 first adapter section
9 second adapter section
8.1 adapter section element
9.1 web
9.2 elastic material
10 hinge bolt
11 wiper arm adapter
11.1 adapter opening
12 shank
13 yoke section
14, 15 angled portion
16 protrusion
17 opening
18 heating filament
19, 20 electrical connecting element
19.1 contact pin
20.1 contact socket
21 electrical supply line
22 attachment element
23,24 housing
23.1,23.2 housing section
23.2.1 recess
24.1,24.2 housing section
24.2.1 widening
25 opening
26 retaining plate
27 opening
28 opening
29 catch
30 bevel or chamfer
$x,y,z$ spatial axis

The invention claimed is:

1. A wiper arm for use with a wiper blade, which is mechanically and detachably connectable to the wiper arm or to a wiper arm adapter by joining in an assembly direction using a wiper blade adapter, the wiper arm comprising:
a first electrical connecting element, disposed on a wiper arm side of the wiper blade adapter, configured to reversibly establish a connection to a second electrical connecting element on a wiper blade side of the wiper blade adapter,
wherein the connection between the first electrical connecting element and the second electrical connecting element is formed along the assembly direction,
wherein at least one of the first electrical connecting element and the second electrical connecting element are mounted floating,
wherein the first electrical connecting element is mounted deflectable in a spatial plane oriented crossways to the assembly direction,
wherein the connection between the first electrical connecting element and the second electrical connecting element is established when a detachable connection is made between the second electrical connecting element and a housing of the electrical connecting element.

2. The wiper arm according to claim 1, wherein the housing comprises:
a recess configured to receive a web of the wiper blade adapter.

3. The wiper arm according to claim 2, wherein a length of the recess is perpendicular to the assembly direction.

4. The wiper arm according to claim 2, wherein a width of the recess is larger than a second width of the web.

5. The wiper arm according to claim 2, wherein a depth of the recess is larger than a second depth of the web.

6. The wiper arm according to claim 2, wherein the housing further comprises:
an elastic material disposed in the recess,
wherein the web directly contacts the elastic material,
wherein the web does not contact the housing.

7. The wiper arm according to claim 1, wherein the housing has a rectangular top portion and an oval bottom portion.

8. The wiper arm according to claim 7, wherein the oval bottom portion has a width larger than the rectangular top portion.

9. The wiper arm according to claim 8, wherein an end portion of the electrical connecting element only includes the oval bottom portion.

10. The wiper arm according to claim 7, wherein an end portion of the electrical connecting element only includes the oval bottom portion.

11. The wiper arm according to claim 7, wherein a top surface of the rectangular top portion is tapered at one end of the rectangular top portion.

12. The wiper arm according to claim 1, further comprising an opening formed in the housing configured to receive a retaining plate.

13. The wiper arm according to claim 12, wherein the opening is formed at a top portion of the housing.

14. The wiper arm according to claim 13, wherein the opening comprises a latch that is configured to latch onto the retaining plate.

15. The wiper arm according to claim 13, wherein the latch is formed downwards within the top portion of the housing.

16. The wiper arm according to claim 12, wherein the opening comprises a latch that is configured to latch onto the retaining plate.

17. The wiper arm according to claim 1, wherein the electric connecting element comprises contact sockets configured to receive plug contacts of the second electrical connecting element.

18. The wiper arm according to claim 1, wherein the housing is moulded plastic.

19. The wiper arm according to claim 1, wherein the housing has a greater dimension in the assembly direction than in directions perpendicular to the assembly direction.

20. A vehicle windscreen wiping device, comprising:
a wiper arm comprising:
a first electrical connecting element for supplying power, and
a current supply,
a wiper blade comprising:
a carrier element configured to hold a wiper rubber, and
a heating element;
a wiper blade adapter, fixed to the carrier element, that is configured to detachably connect the wiper blade to a wiper arm, the wiper blade adapter comprises:
a second electrical connecting element on a wiper blade side of the wiper blade adapter comprising:
an electrical contact configured to reversibly establish an electrical connection between the heating element and the current supply, and
a housing; and
a wiper arm adapter disposed on or attached to the wiper arm,
wherein the wiper arm adapter is oriented along a longitudinal extension of the wiper arm in an assembly direction,
wherein the first electrical connecting element is configured for detachable connection to the second electrical connecting element,
wherein the detachable connection between the first electrical connecting element and the second electrical connecting element is formed along the assembly direction,
wherein the detachable connection is between the housing of the second electrical connecting element and the first electrical connecting element,
wherein the second electrical connecting element is mounted to the wiper blade adapter,
wherein the mounted electrical connecting element is floating from the wiper arm adapter,
wherein the mounted electrical connecting element is deflectable in a spatial plane crossways in relation to the assembly direction.

* * * * *